Dec. 26, 1950 E. A. GLYNN 2,535,281
DUST COLLECTOR

Filed June 22, 1948 2 Sheets-Sheet 1

INVENTOR
E. A. Glynn
BY
ATTORNEYS

Dec. 26, 1950 E. A. GLYNN 2,535,281
DUST COLLECTOR
Filed June 22, 1948 2 Sheets-Sheet 2
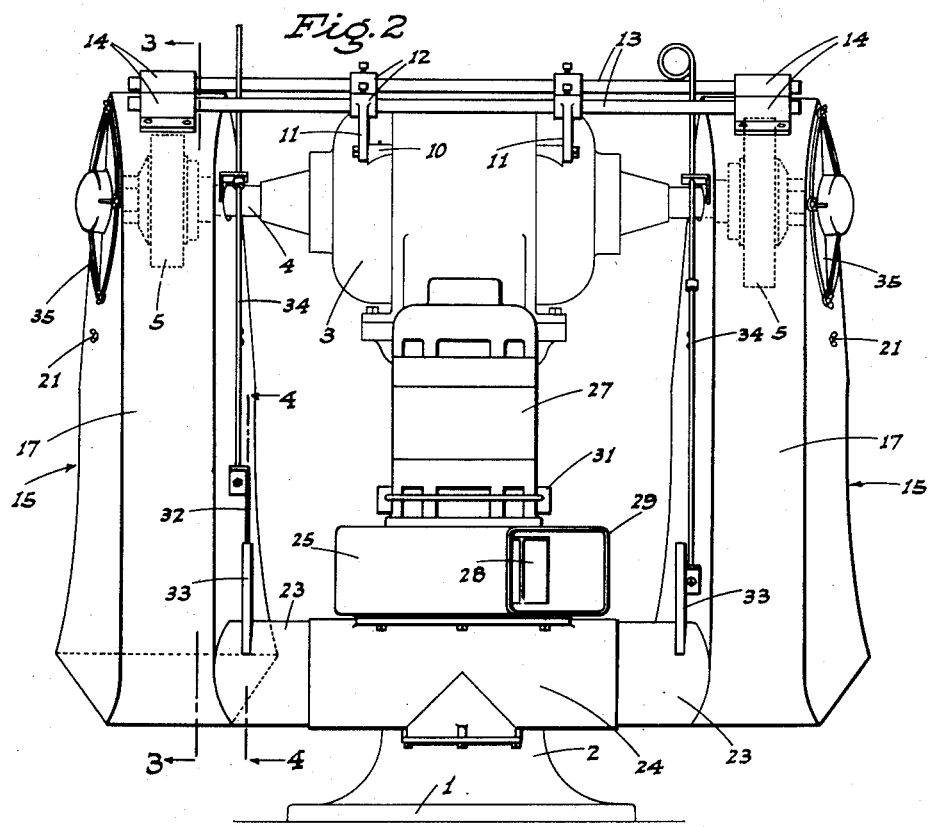
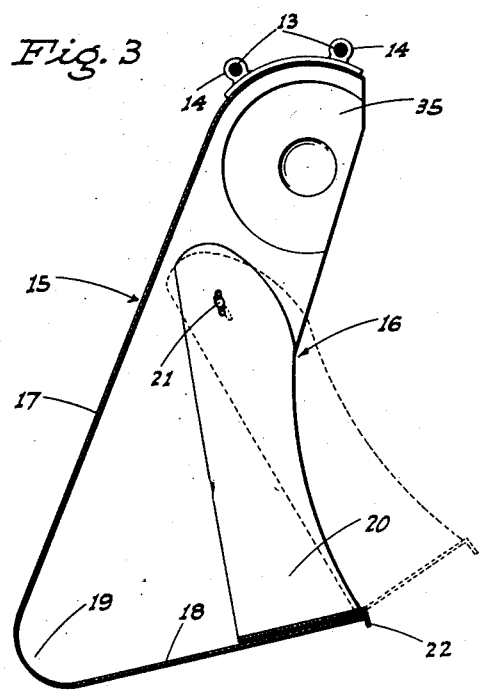
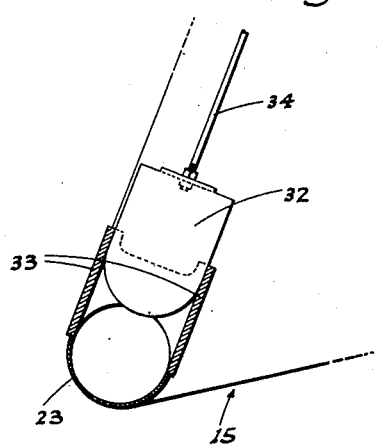
INVENTOR
E. A. Glynn
BY
ATTORNEYS Patented Dec. 26, 1950

2,535,281

UNITED STATES PATENT OFFICE 2,535,281

DUST COLLECTOR

Edwin A. Glynn, Lodi, Calif., assignor to Super Mold Corporation of California, Lodi, Calif., a corporation of California Application June 22, 1948, Serial No. 34,426

1 Claim. (Cl. 51—273)

This invention is directed to, and it is an object to provide, a novel suction type device for collecting the dust or buffings from a power driven tire tread buffing machine; it being the practice to buff off the old and worn tread of a tire preparatory to vulcanizing a new tread thereon.

Another object of the invention is to provide a dust collector which embodies a novel assembly of dust receiving hoods, suction ducts, and suction fan; said assembly being adapted especially for use on pedestal type tire tread buffing machines.

A further object of the invention is to provide a dust collector, as above, which includes dust receiving hoods which are of novel configuration, being designed to accomplish the retention, for delivery to the suction ducts, of a maximum part of the buffings from the machine.

An additional object of the invention is to provide a dust collector, as in the preceding paragraph, in which said hoods are adjustable for use with tires of different diameter; such adjustment being made by means of a movable apron arrangement on each hood.

It is also an object of the invention to provide a dust collector, wherein the suction ducts leading to the dust receiving hoods are fitted with manually controlled valves so that the full suction of the device can be imposed selectively on one hood or the other.

A further object of the invention is to provide a practical, reliable and efficient dust collector, and yet one which will be exceedingly effective for the purpose for which it is designed.

These objects are accomplished by means of such structure and relative arrangement of parts as will fully appear by a perusal of the following specification and claims.

In the drawings:

Fig. 2 is a rear end elevation of the machine and dust collector.

Fig. 3 is a cross section, through one of the dust receiving hoods, on line 3—3 of Fig. 2.

Fig. 4 is a fragmentary cross section on line 4—4 of Fig. 2.

Figure 1:
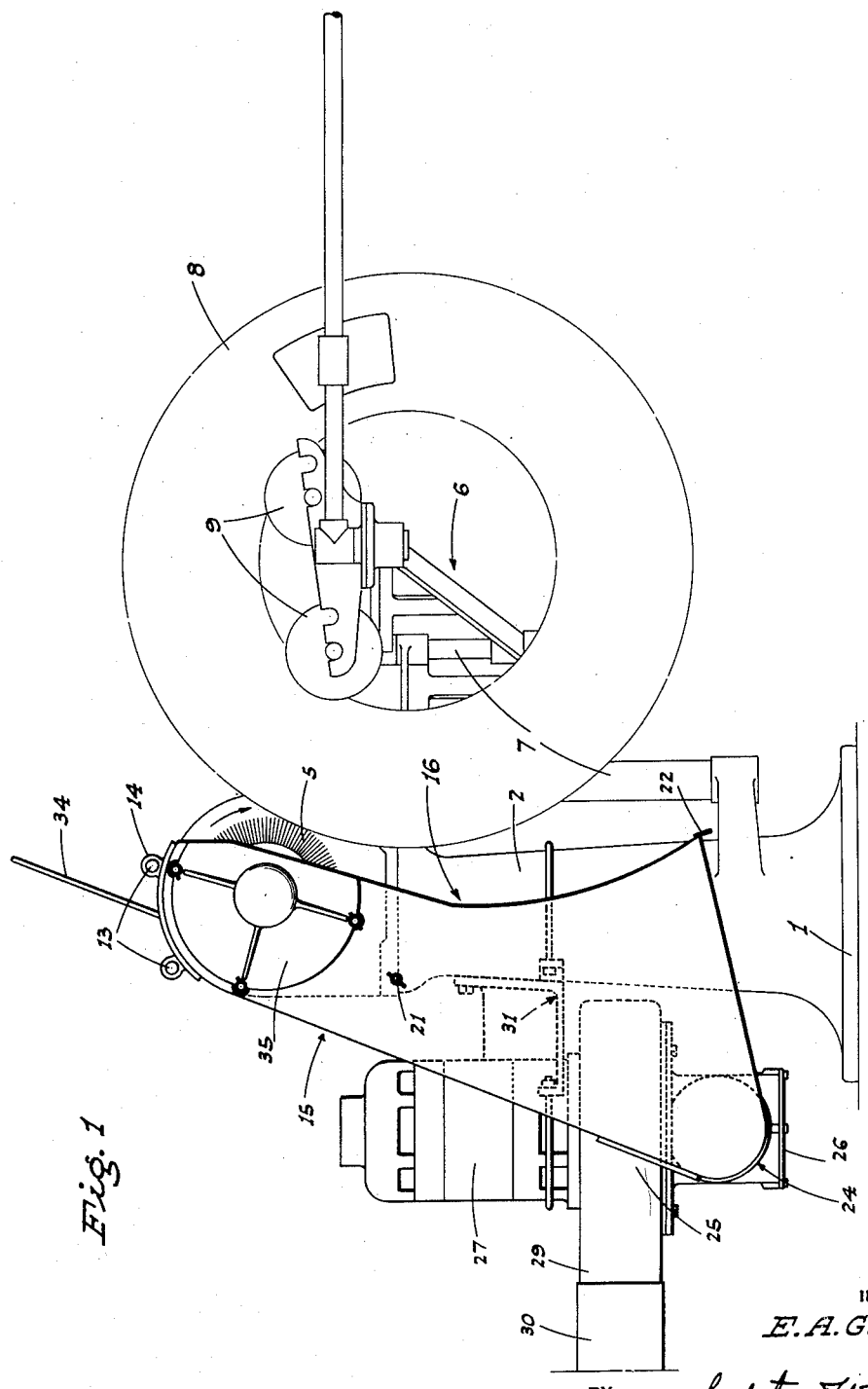
Fig. 1 is a side elevation of a pedestal type tire buffing machine fitted with the improved dust collector.

Referring now more particularly to the characters of reference on the drawings, the dust collector is here illustrated as mounted in connection with a pedestal type tire buffing machine, which includes a base 1 and an upstanding pedestal 2. At its upper end the pedestal 2 supports an electric motor 3 having spindles or shafts 4 projecting laterally from opposite ends thereof; each of said spindles being fitted with a rotary buffing device 5.

A tire supporting and manipulating unit 6 is disposed in front of the pedestal 2 and is secured in connection therewith by a swivel mount 7. The swivel mount 7 permits the unit 6, with a tire 8 thereon, to be manipulated so as to present the tread of such tire to either one of the buffers 5, selectively; said unit 6 including rollers 9 on which the tire 8 may be rotated during the buffing process.

When either of the buffers 5 is acting on the tread of a tire 8, there results a considerable quantity of dust, buffings, and smoke, and the present invention provides an effective collector therefor.

Such dust collector comprises the following structural arrangement:

The electric motor 3 includes motor bosses 10, to which attachment members 11 are secured; said attachment members 11 each including a pair of collars 12 above, but spaced circumferentially of, said motor 3, with the axis of said collars extending parallel to the shafts 4.

A pair of cross rods 13 extend through the collars 12, being maintained therein by set screws, as shown; said cross rods projecting, at the ends, in overhanging relation to corresponding ones of the buffers 5.

At opposite ends the cross rods 13 are fitted with attachment brackets 14, which are secured to the upper ends of a pair of dust receiving hoods 15, which depend therefrom. The dust receiving hoods 15 are open at the front, and the corresponding buffer 5 runs in the upper end portion of each hood, with the buffer projecting slightly ahead thereof for tire engagement.

The dust receiving hoods 15 are each vertically elongated, and include side plates 16 which converge rearwardly from the relatively wide open front 16 of the hood. Additionally, each hood includes a back wall 17 and a bottom plate 18; said back wall and bottom plate extending at a downward and rearward slope in converging relation to each other, whereby to form a dust receiving pocket 19 in each hood at its lower back corner; said pocket 19 thus being lower than the forward edge of the bottom plate 18.

The buffers 5 turn in the direction indicated by the arrow in Fig. 1, and thus the dust or buffings are discharged from said buffers in a generally downward and rearward direction into the hoods and pockets 19 thereof.

The front 16 of each dust receiving hood 15 is generally convex, whereby to permit a supported tire 8 to engage either of the buffers 5 without striking the desired hood. When a tire of relatively small diameter is being buffed, the corresponding hood 15 is adjusted by swinging out from the front thereof a generally U-shaped extension apron 20 pivoted, at its upper ends, as at 21, in connection with the side plates 16 intermediate the ends of the latter. The pivots 21 are preferably bolts with wing nuts. Each extension apron 20 includes a stop flange 22 on its lower front edge, which limits the extent to which said apron may swing into its hood.

The normal position of each extension apron 20 is shown in full lines in Fig. 3, whereas its outward adjusted position, for use with a small diameter tire, is shown in dotted lines in said figure. Adjacent the bottom and back thereof, and in communication with the pockets 19, the dust receiving hoods 15 are formed with laterally inwardly projecting transition ducts 23 which engage in opposite ends of an intake fitting 24 fixed to the bottom of, and arranged in communication with, a vertical axis, fan housing 25. The fitting 24 includes a removable clean-out plate 26 at the bottom thereof.

A vertical-axis, electric motor 27 is mounted on top of the fan housing 25 and drives a suction fan 28 in said housing; the latter including a generally tangential discharge neck 29 which projects rearwardly. The neck 29 is adapted to engage in a carry-off duct 30 which may lead to a suitable receiver, such as a dust collecting cyclone (not shown).

The motor 27 is secured to the pedestal 2 by an attachment unit, indicated generally at 31, whereby the motor 27, fan housing 25, and fitting 24 are all rigid with said pedestal. Further, as the transition ducts 23 are fixed to the hoods 14 and engage in the fitting 24, the lower ends of said hoods are stabilized.

Each of the transition ducts 23 is fitted with an upwardly movable, gate-type valve 32 slidably carried in guides 33; there being a control rod 34 extending upwardly from each gate 32 to a point above the cross rods 13 for manual access by the operator.

The outer side plates 16 of the hoods 15 are fitted, at the upper ends thereof, with removable end covers 35, whereby to permit of access to the buffers 5 for removal thereof for the purpose of repair or replacement.

When the above described dust collector is in use, with the motor 27 running, and causing a suction in the intake fitting 24, the valve 32 corresponding to the buffer 5 which is in use, is open, and the other of said valves 32 is closed, so that the entire suction is on the corresponding dust receiving hood 15. The dust, buffings, and smoke from the buffer 5 in use feed downwardly in the corresponding hood 15 into the pocket 19, and thence are picked up by the suction and drawn through the adjacent duct 23 into the fitting 24. From the fitting 24 the accumulated dust, buffings, and smoke are drawn through the fan housing 25 and are discharged through neck 29 into the carry-off duct 30.

The arrangement is such that very little of the dust, buffings, and smoke, from a tire tread buffing operation, escapes the adjacent hood 15.

The described configuration of the hoods 15 is of material advantage in the accomplishment of this result. In this connection the tapering of each hood 15 from its open front 16 to its back wall 17, together with the downward inclination and convergence of said back wall 17 and bottom plate 18 to form the pocket 19, are all of importance.

The configuration of the hoods 15 is such that there is no material surging of the dust, buffings, or smoke forwardly out of the open front 16 of said hoods.

The described dust collector for tire buffing machines thus provides an effective and practical device for the intended purpose, yet without interfering in any way with normal operation of the buffing machine.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In combination: a vertically disposed pedestal, a motor supported on the upper end of the pedestal, a horizontally disposed driven spindle projecting from each end of the motor, a rotatable abrading element fixed on the end of each spindle, means on the pedestal for supporting and moving an object into and out of engagement with the abrading elements, a pair of longitudinally spaced apart bosses on the motor, a pair of collars on each boss, such collars being spaced apart circumferentially with respect to the spindle axes and the axis of the collars being parallel with the axes of the spindles, a rod fixed in each collar and projecting outwardly in overhanging relation to the abrading elements, an attachment bracket supported at the outer end of each of the rods and a hood supported on each attachment bracket, each hood partially enclosing one of the abrading elements with the exposed portions of the abrading elements facing the object supporting and moving means.

EDWIN A. GLYNN.

REFERENCES CITED

The following references are of record in the file of this patent:

UNITED STATES PATENTS

| Number | Name | Date |
|---|---|---|
| 289,986 | Coy | Dec. 11, 1883 |
| 502,883 | Gould | Aug. 8, 1893 |
| 787,340 | Middleton | Apr. 11, 1905 |
| 819,021 | Mueller et al. | Apr. 24, 1906 |
| 1,148,533 | Piatt | Aug. 3, 1915 |
| 1,177,342 | Leiman et al. | Mar. 28, 1916 |
| 1,217,996 | Partridge | Mar. 6, 1917 |
| 1,283,948 | Stevens | Nov. 5, 1918 |
| 1,476,195 | Dobyne | Dec. 4, 1923 |
| 1,912,491 | Minett | June 6, 1933 |
| 2,064,871 | Angradi | Dec. 22, 1936 |
| 2,282,365 | Linderoth | May 12, 1942 |
| 2,301,351 | Willmott | Nov. 10, 1942 |

FOREIGN PATENTS

| Number | Country | Date |
|---|---|---|
| 15,034 | Great Britain | Apr. 21, 1910 |
| 351,663 | France | July 22, 1905 |
| 373,549 | Germany | Apr. 13, 1923 |